(No Model.)

F. TEAL.
APPARATUS FOR WATERING STOCK.

No. 319,038. Patented June 2, 1885.

WITNESSES

INVENTOR
Furgerson Teal.
By C. A. Snow & Co.
Attorneys

UNITED STATES PATENT OFFICE.

FURGERSON TEAL, OF UTICA, IOWA.

APPARATUS FOR WATERING STOCK.

SPECIFICATION forming part of Letters Patent No. 319,038, dated June 2, 1885.

Application filed April 10, 1885. (No model.)

*To all whom it may concern:*

Be it known that I, FURGERSON TEAL, a citizen of the United States, residing at Utica, in the county of Van Buren and State of Iowa, have invented a new and useful Improvement in Apparatus for Watering Stock, of which the following is a specification, reference being had to the accompanying drawings.

My invention relates to an improved apparatus for watering stock; and it consists in the combination and arrangement of parts that will be more fully set forth hereinafter, and particularly pointed out in the claim.

Figure 1:
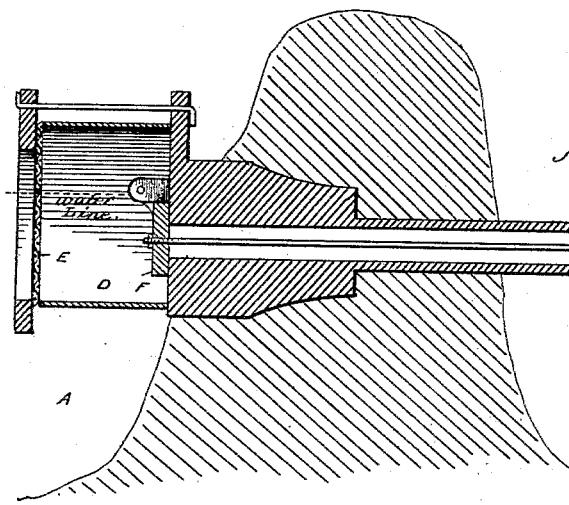
Figure 1:
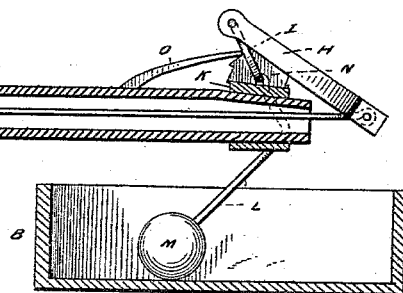
Figure 2:
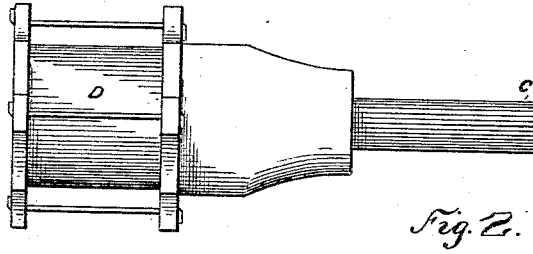
Figure 2:
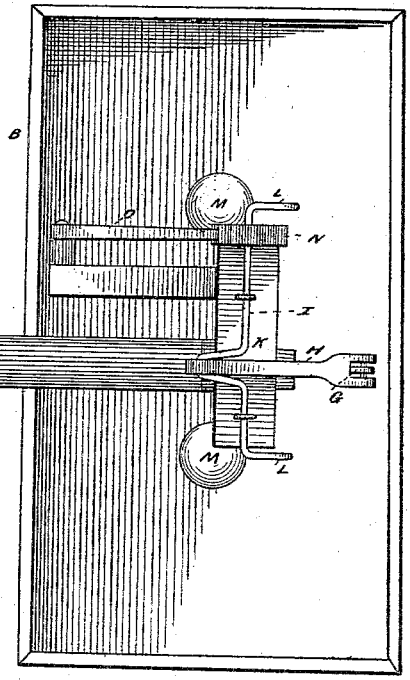

In the accompanying drawings, Figure 1 is a sectional view of an apparatus embodying my invention. Fig. 2 is a top plan view of the same.

A represents a pond, and B a trough which is located on the outer side of the pond.

C represents a pipe which leads from the trough to the pond, and D represents a valve-seat which is located at the inner end of the pipe. This seat is closed on its sides, and is covered on its inner end with a wire-gauze, E.

F represents a clack-valve which is located in the valve-seat, and to which is fulcrumed a rod, G, that extends through the pipe, and has its outer end connected to the lower end of a link, H, which has its upper end fulcrumed on a crank-lever, I, which is journaled on a cross-piece, K, that is secured to the outer end of the pipe. Bent arms L extend from the crank-lever, and to these ends are secured floats M. A ratchet-wheel, N, is secured to the crank-lever, and with this ratchet-wheel engages a pivoted pawl, O.

The operation of my invention is as follows: When the water in the trough is below the desired level, the floats open the valve and allow the water to flow through the pipe into the trough until the water fills the trough to the desired degree, and as the floats rise with the water in the trough the flow of water from the pond to the trough will be cut off at this point. As the water in the trough is used and its level is lowered, the operation will be repeated as before, and thus the trough will be kept constantly filled. Ordinarily the ratchet is thrown out of engagement with the pawl; but in cold weather, when there is danger of freezing the valve to its seat, the floats will be raised so as to close the valve, and the ratchet will be caused to engage with the pawl and the valve will be kept normally closed.

Having thus described my invention, I claim—

The combination of the valve-seat, the pipe connected thereto, the valve located in the seat, the rod secured to the valve, the lever journaled on the outer end of the pipe connected to the outer end of the rod, floats secured to the lever, the ratchet-wheel on the lever, and the pawl for engaging with the ratchet-wheel, substantially as described.

In testimony that I claim the foregoing as my own I have hereto affixed my signature in presence of two witnesses.

FURGERSON TEAL.

Witnesses:
D. C. McCULLOUGH,
J. W. NELSON.